United States Patent Office 3,017,092
Patented Jan. 16, 1962

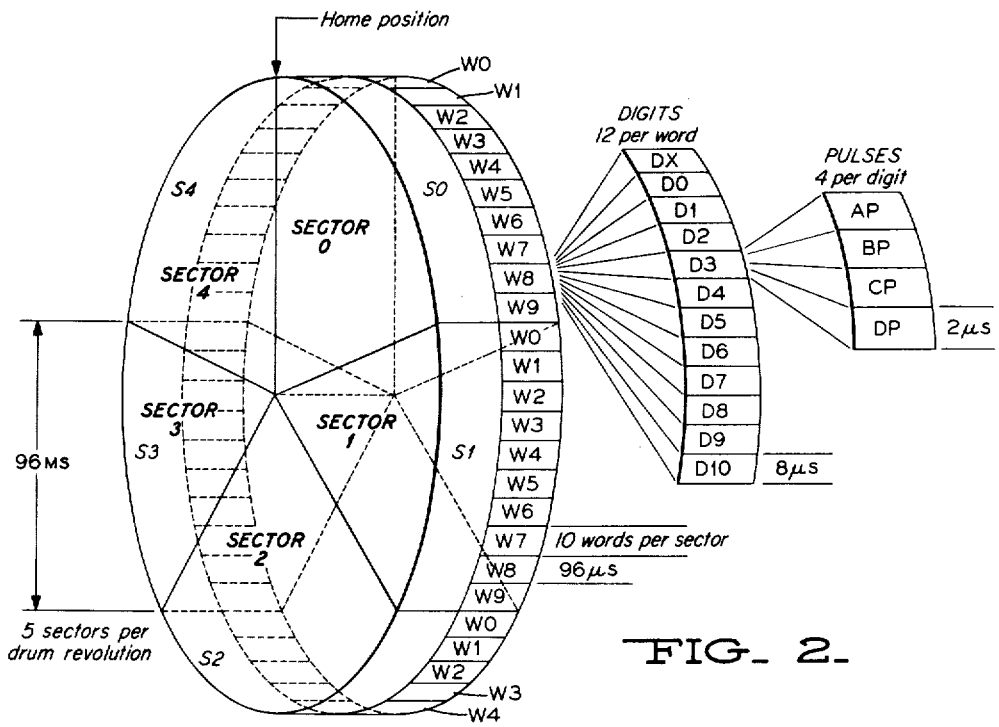
FIG. 2.
| DECIMAL DIGIT VALUE | VALUE ASSIGNED TO EACH BINARY DEVICE | | | | |
|---|---|---|---|---|---|
| | 0 | 1 | 2 | 3 | 6 |
| 0 | 0 | 1 | 1 | 0 | 0 |
| 1 | 1 | 1 | 0 | 0 | 0 |
| 2 | 1 | 0 | 1 | 0 | 0 |
| 3 | 1 | 0 | 0 | 1 | 0 |
| 4 | 0 | 1 | 0 | 1 | 0 |
| 5 | 0 | 0 | 1 | 1 | 0 |
| 6 | 1 | 0 | 0 | 0 | 1 |
| 7 | 0 | 1 | 0 | 0 | 1 |
| 8 | 0 | 0 | 1 | 0 | 1 |
| 9 | 0 | 0 | 0 | 1 | 1 |
← ONE GENERAL STORAGE BAND ON DRUM →
FIG. 3.
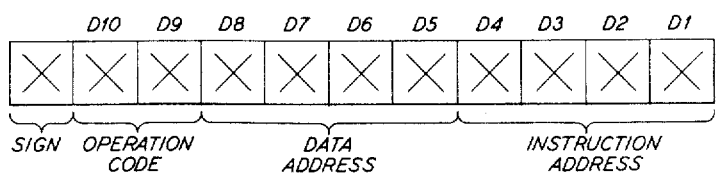
FIG. 4.

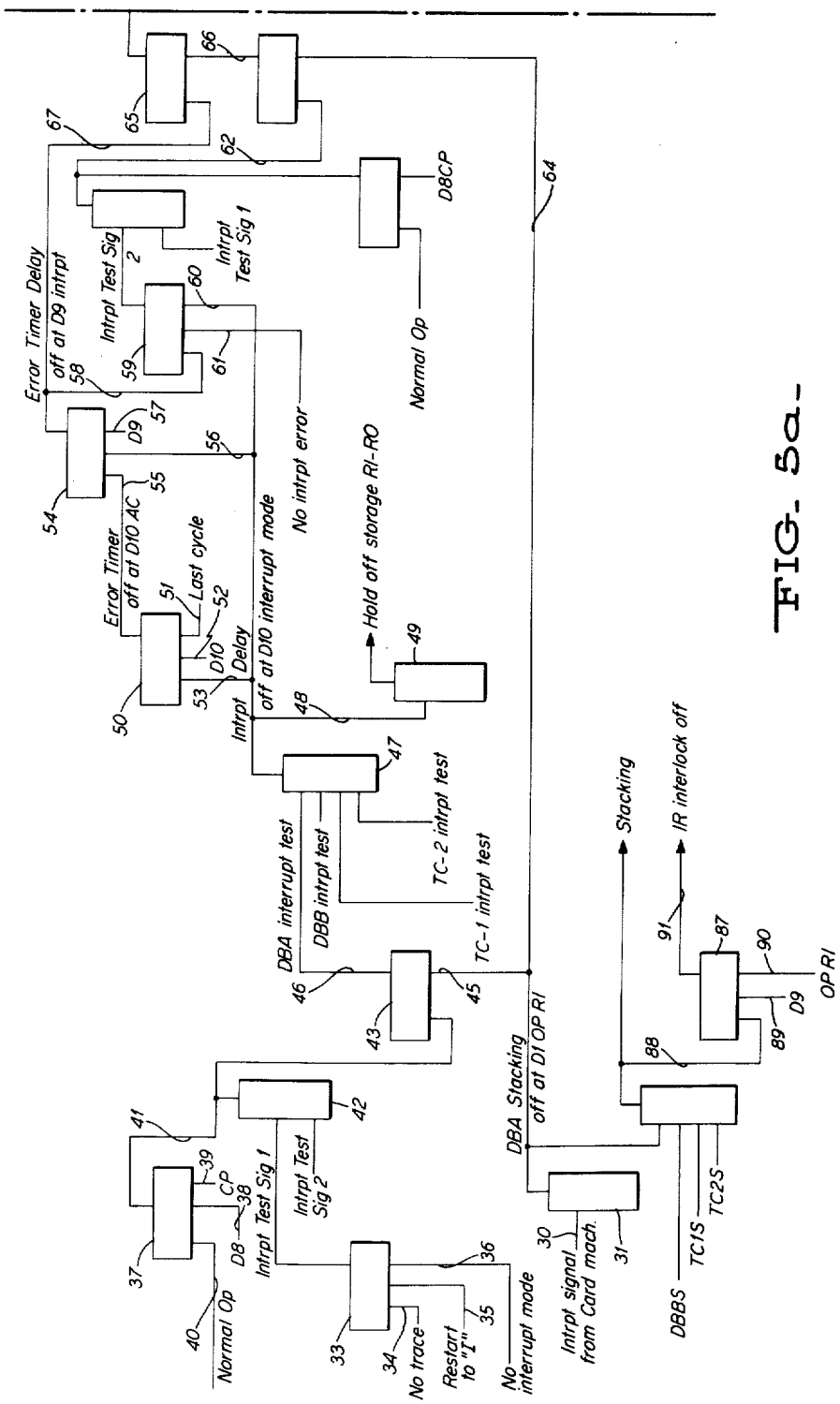

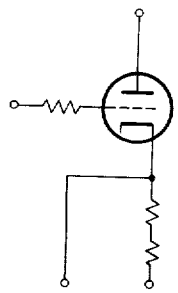
FIG. 13.
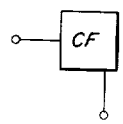
FIG. 13a.
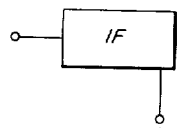
FIG. 15.
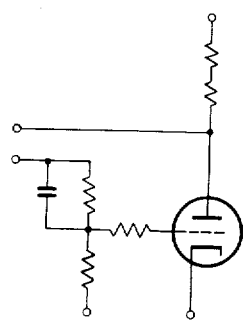
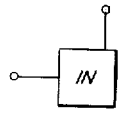
FIG. 14a.
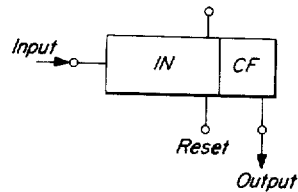
FIG. 16.
FIG. 14.
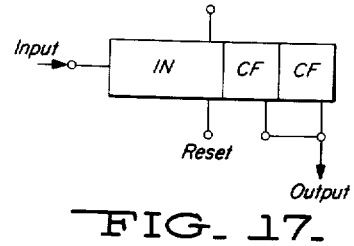
FIG. 17.
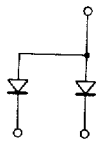
FIG. 18.
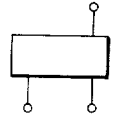
FIG. 18a.
FIG. 18b.
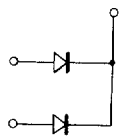
FIG. 19.
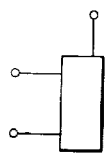
FIG. 19a.
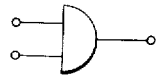
FIG. 19b.

3,017,092
PROGRAM CONTROL FOR DATA STORAGE
AND PROCESSING MACHINE
Edward F. Rent, Vestal, and Flavious M. Powell, Johnson City, N.Y., assignors to International Business Machines Corporation, New York, N. Y., a corporation of New York
Filed Sept. 6, 1957, Ser. No. 682,487
11 Claims. (Cl. 235—153)

This invention relates to an improvement in the programming of high speed data storage and processing systems and particularly to stored program type data processing machines.

A frequently used system of classifying high speed digital data storage and processing machines is according to the type of programming used. A stored program type machine is one in which the sequence of steps of data processing or the sequence of functions of the machine is under the control of instructions contained in some type of storage device or devices within the machine. Heretofore machines of this type have been built having high programming capacity, high storage capacity, and a high degree of flexibility and the prime object of this invention is to provide improved automatic programming features for such a machine.

The present invention is disclosed herein as embodied in a data processing machine of the type shown and described in detail in common assignee's copending application, to F. E. Hamilton et al., Serial Number 544,520, now U.S. Patent No. 2,959,531 issued November 8, 1960, filed November 2, 1955, and entitled "Data Storage and Processing Machine." The machine disclosed in said pending application is provided with a magnetic drum for storing a large quantity of data as magnetized spots on its surface. A program storage device is provided for storing a single program step or word. The program word is divided into three portions; an address portion for instructing the machine where data to be processed is located in storage, an operation portion for instructing the machine what operation or process the machine is to perform with the data found at the address of the address portion, and an instruction portion for instructing the machine where the next program step is located in storage. An address register and an operation register are provided for receiving the address portion and the operation portion respectively from the program storage device. Switching circuitry is provided under control of the address register for selecting any storage position on the drum or any other storage device in the machine in accordance with the value stored in the address register. Switching circuitry is also provided under the control of the operation register for determining the operation the machine is to perform on the data found at a selected address position. After an address is selected and the data found at the address is operated upon by the machine the instruction portion of the program value is entered into the address register from program storage to replace the value previously in the register. A new program step located at the address in storage corresponding to the instruction portion of the program step in the address register is selected and transferred into the program storage device to replace the value previously stored therein. Alternately a test may be made by the machine, and if a predetermined condition is found to exist, the address portion of a program step may be caused to remain in the address register and the next program step selected in accordance therewith and entered into the program storage device. Large numbers of program values and large amounts of other data may be stored on the magnetic drum. Thus, the sequence of the above-outlined procedure may automatically continue for a large number of program steps.

Accumulators, adders and distributor circuits are also provided in the machine for performing the various calculating operations called for by the operation portions of the program words. A stored sequence of such program or instruction words forms a program or "program routine."

The machine is programmed or pre-loaded to carry out a plurality of main program routines. Pre-loading is generally accomplished by loading a few instructions into storage entry switches through the control console. These few instructions are used to enter more complete loading routines. The original data and instructions are normally stored in drum storage locations from punched cards or magnetic tapes during the loading process. During operation of the machine, should an abnormal condition or error occur, certain error circuits will be called in and the machine stopped. The operator, then, by depressing an error reset key on the console, can reset the error circuits and cause the program to continue when the program start key is depressed. Also, circuitry is provided whereby the operator at the console may reset the computer which has been stopped due to an abnormal or error condition, restart the machine and place the machine under control of so-called re-run instructions which were pre-loaded into the machine and which in effect will cause the machine to go back and re-run a portion or all of the main routine which was in progress when the abnormal or error condition occurred.

It can be readily understood, then, that abnormal or error conditions arising in the machine call for manual intervention by the operator and to provide for re-run operations it is necessary for the programmer, when loading the machine, to store in the machine a plurality of re-run instructions. These re-run instructions will have to be inserted at random intervals throughout the sequence of program routines, or at least at the start of each program routine, since it cannot be known in advance where in the sequence of operations abnormal conditions will arise. Manual intervention for corrections and re-runs of program routines are, of course, quite time consuming as well as placing additional burdens on the operator and programmer of the machine and it is in the interest of eliminating such shortcomings that the present invention has been provided.

Accordingly, another prime object of the present invention is to provide an improved data processing machine which can be quickly and automatically adjusted when abnormal conditions occur.

Another important object of the present invention is to provide an improved data processing machine which includes means for automatically interrupting a main program routine when an abnormal condition occurs or when it is desirable to insert a subroutine.

A further object of the present invention is to provide an improved data processing machine wherein when an abnormal condition occurs the main routine in progress is automatically interrupted and a subroutine is automatically called into operation at the completion of which machine control is automatically returned back to the main routine at the point of interruption.

A further object of the present invention is to provide an improved data processing machine as in the preceding object and wherein the address data in the address register at the time of interruption is automatically transferred to auxiliary storage for storage during a subroutine operation and then automatically transferred back to the address register at the completion of the subroutine operation.

A further object of the present invention is to provide an improved data processing machine wherein program controlled drum buffer and tape control interrupts are provided, any one of which may be called to allow the main routine to be interrupted and an independent program accomplished after which the machine returns to the main routine at the point of interruption.

A further object of the present invention is to provide an improved data processing machine wherein a plurality of interrupt signals are provided to automatically control programming of the machine and wherein the machine is interlocked such that only one interrupt may be processed at a time.

A still further object of the present invention is to provide an improved data processing machine wherein a plurality of interrupt signals which may occur are stored on stacking switches and processed according to a priority circuit.

A still further object of the present invention is to provide an improved data processing machine wherein an interrupt register is provided which receives each address interrupt entered in the address register and interrupt signals control the operation of the interrupt register.

In accordance with the embodiment of the invention disclosed herein provision is made in a data processing machine to automatically interrupt the main routine when an abnormal condition occurs or when it is desirable from a programming standpoint. This results in efficient utilization of machine time because manual intervention is reduced. When the interrupt is programmer planned, two or more programs can be processed at the same time with automatic scheduling being done by the machine. Tape read-write errors, and tape end-of-file conditions cause the program to be interrupted automatically. Tape read-write as well as card input-output operations can be programmed to interrupt the main routine.

An integral part of interrupt operations is an interrupt register. At the same time that the I-address of each instruction is sent to the address register it is also entered into the interrupt register. When an interrupt condition occurs, the next instruction is not taken from the normal I-address location, but rather from a predetermined location which is fixed by the type of interrupt. The address of the next instruction of the main routine is saved in the interrupt register. Upon completion of the interrupt routine, control can be returned to the main program and the address of the instruction executed will come from the interrupt register. Returning of the control to the main routine is accomplished by using a release interrupt command.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 2 illustrates how the drum is arranged in sectors, words, digits and pulse times.

FIG. 3 shows how the ten decimal digits are represented in the two-out-of-five code.

FIG. 4 illustrates the components of a word of program instruction data.

Figure 5B:
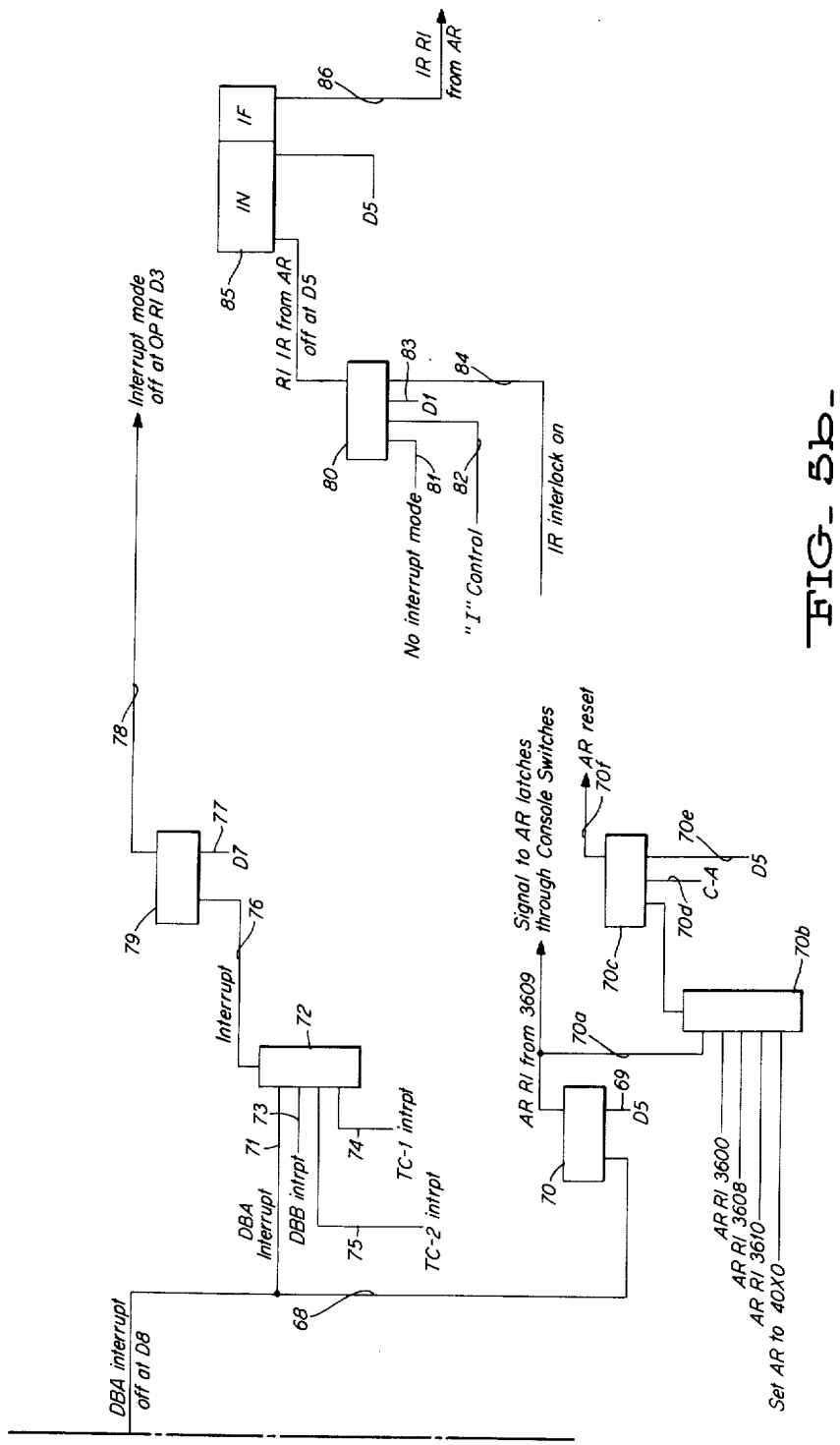

FIGS. 5a and 5b, taken together, comprise an outline of the logic circuits for carrying out interrupt operations.

Figure 6:
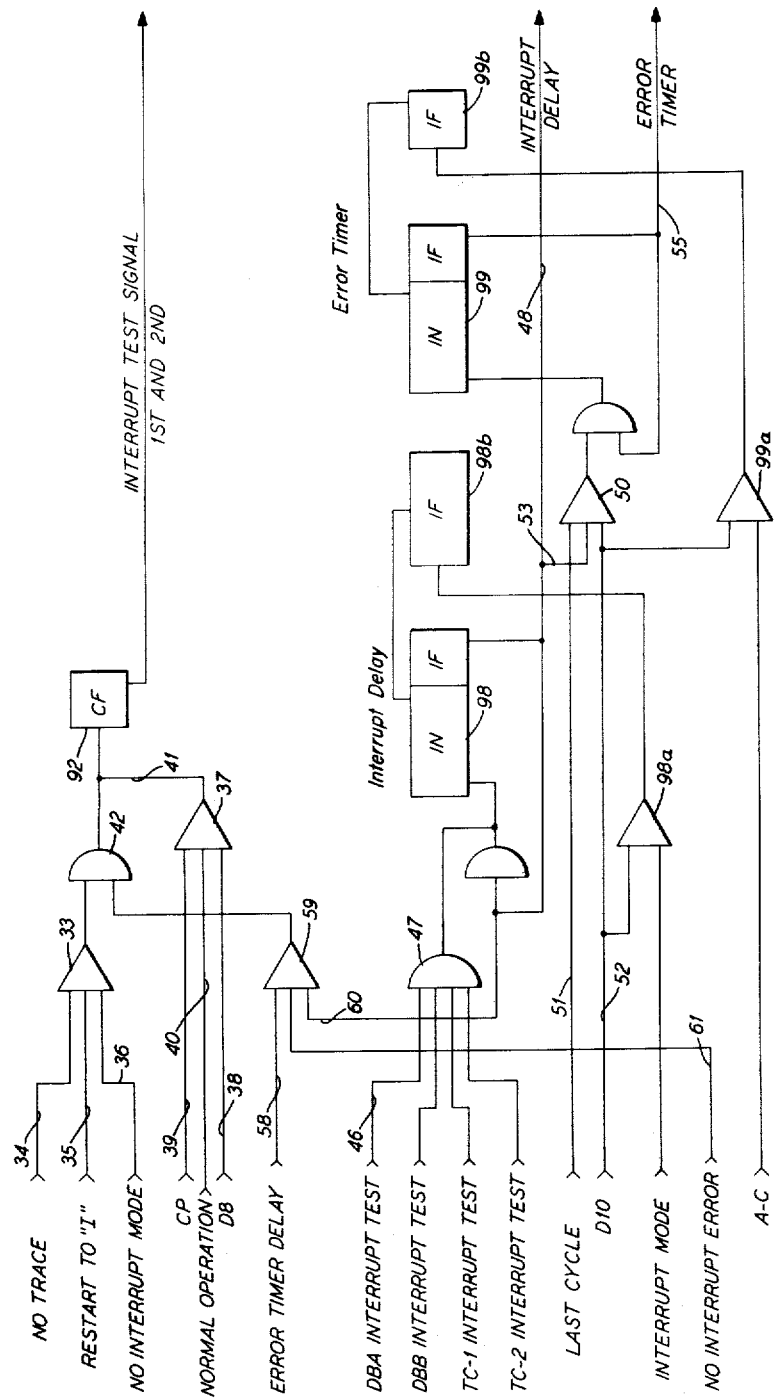

FIG. 6 is a diagram of the logic circuits for developing the interrupt test signals, the interrupt delay signal and the error timer signal.

Figure 7:
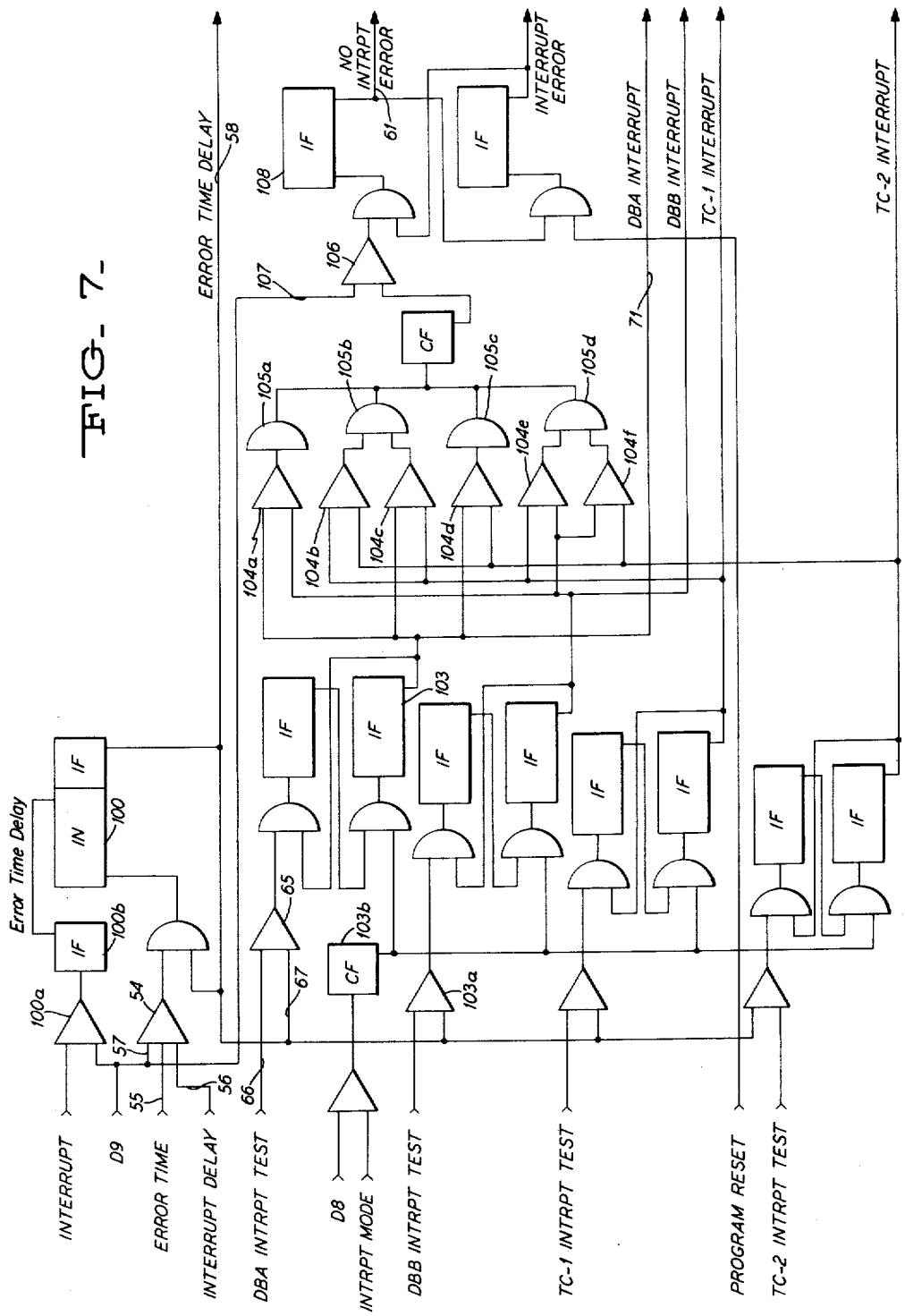

FIG. 7 is a diagram of the logic circuits for developing the error time delay signal and various interrupt signals.

Figure 8:
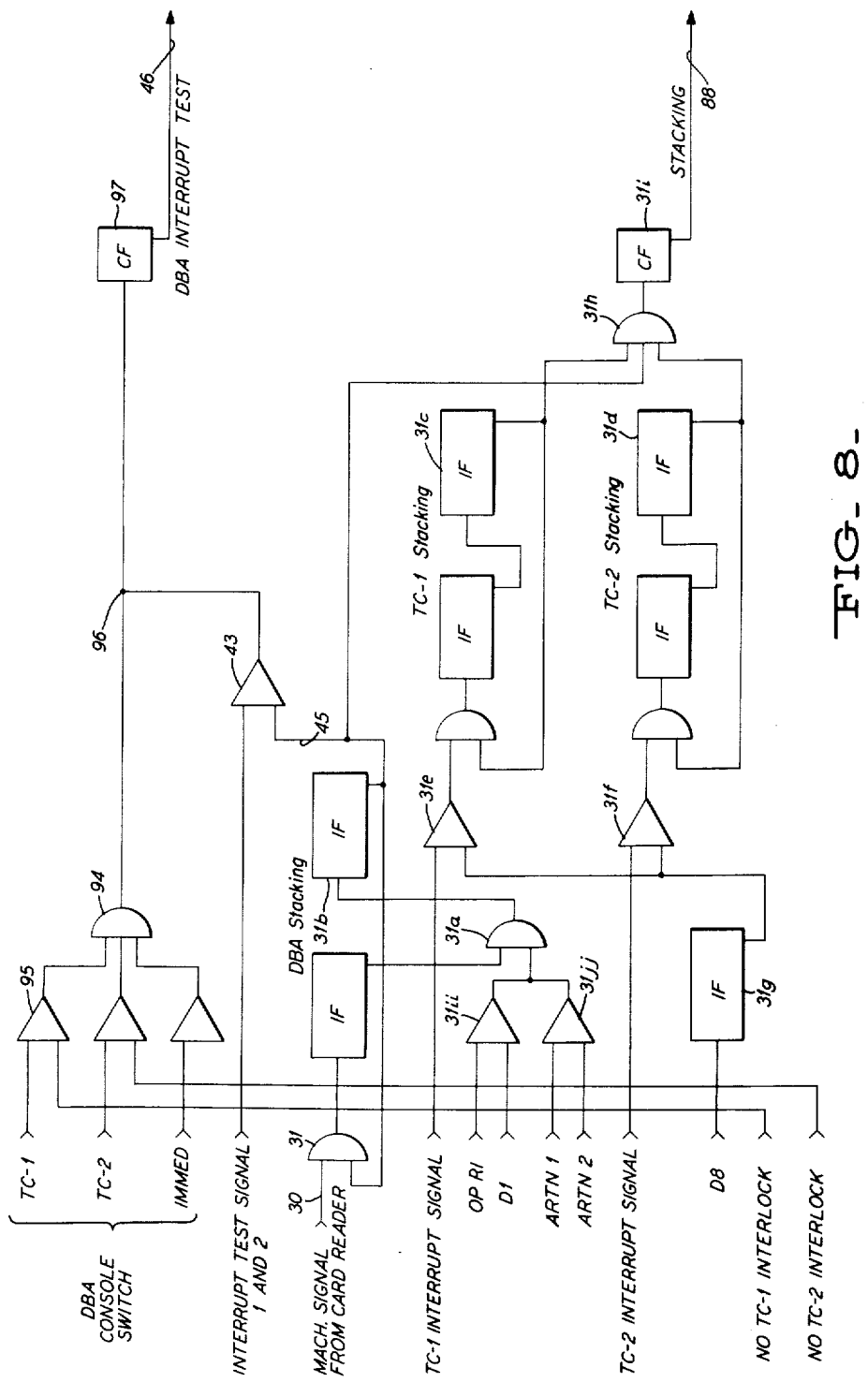

FIG. 8 is a diagram of the logic circuits for developing the interrupt test and stacking signals.

Figure 9:
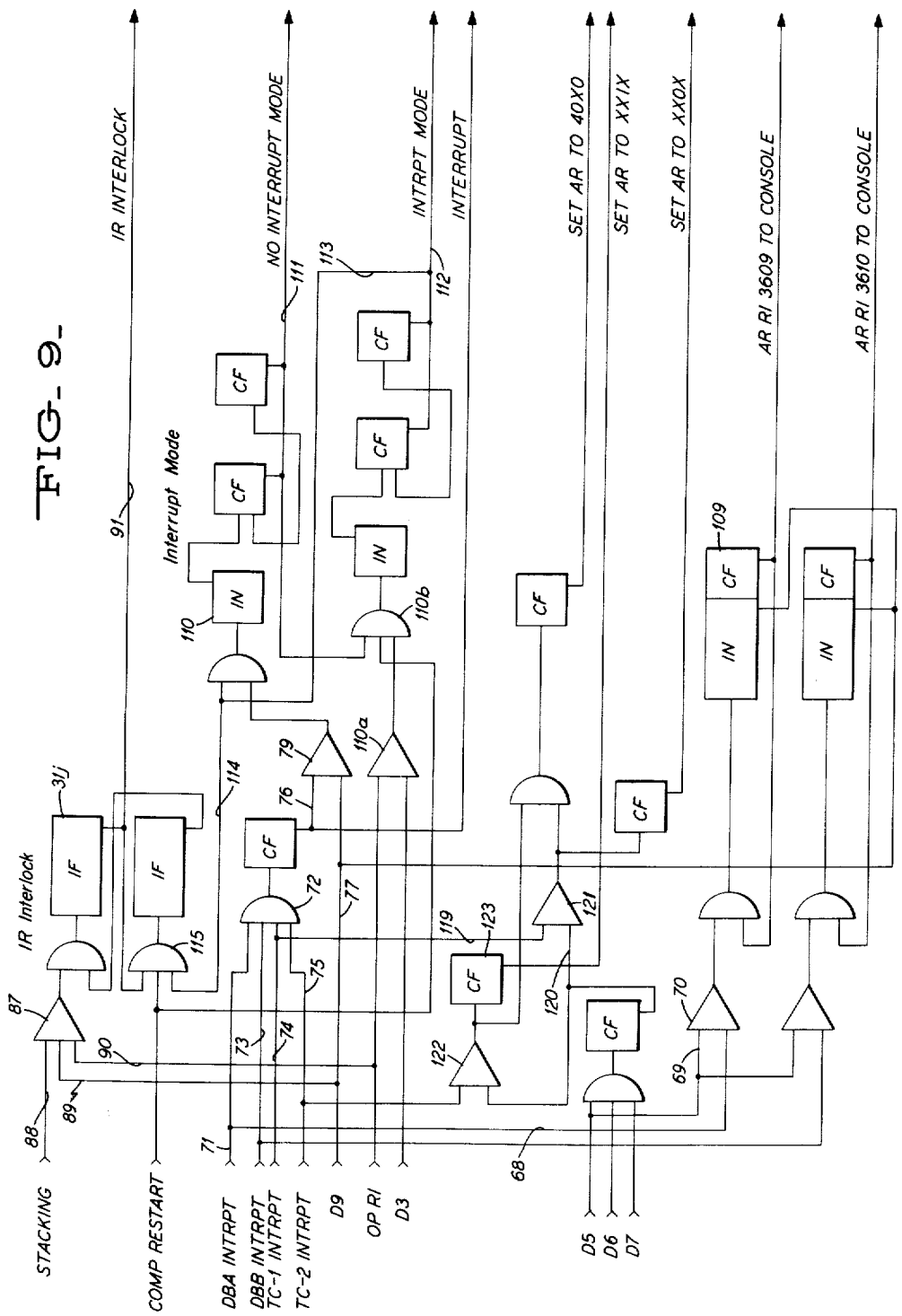

FIG. 9 is a diagram of the logic circuits for developing the interrupt interlock, interrupt mode and no interrupt mode signals.

Figure 10:
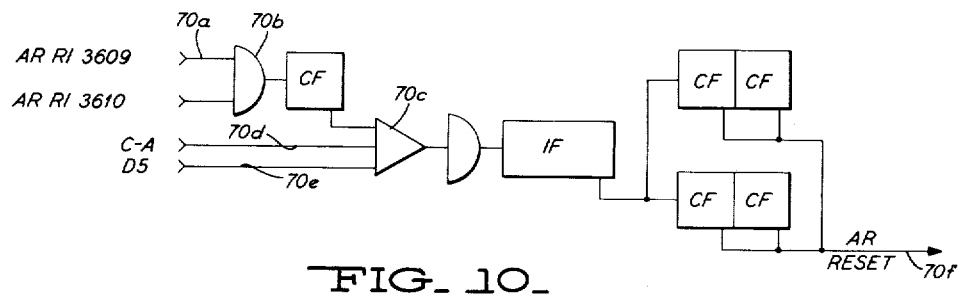

FIG. 10 is a diagram of the logic circuits for resetting the address register.

Figure 11:
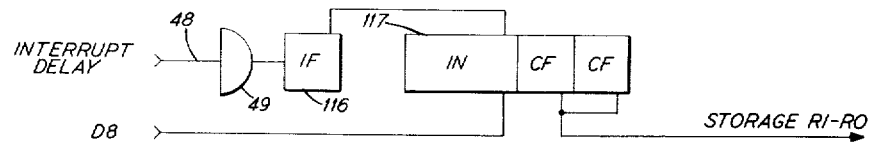

FIG. 11 is a diagram of the logic circuits for developing the storage readin and readout signal.

Figure 12:
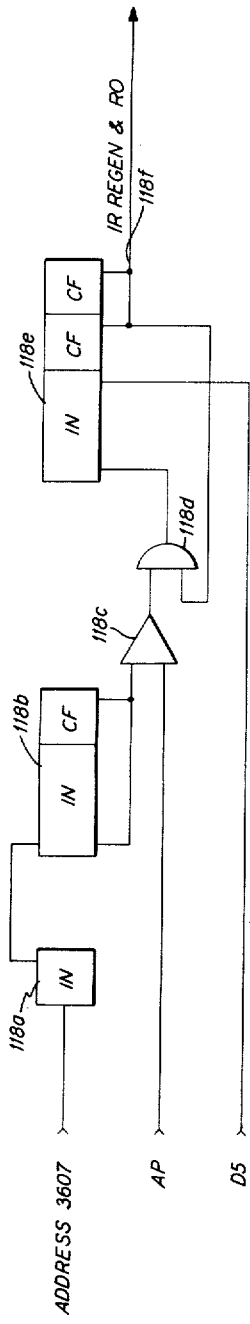

FIG. 12 is a diagram of the logic circuits for developing the interrupt register regeneration and readout signal.

FIGS. 13–19b illustrate typical electronic components which are used in the machine circuitry.

Figure 20:
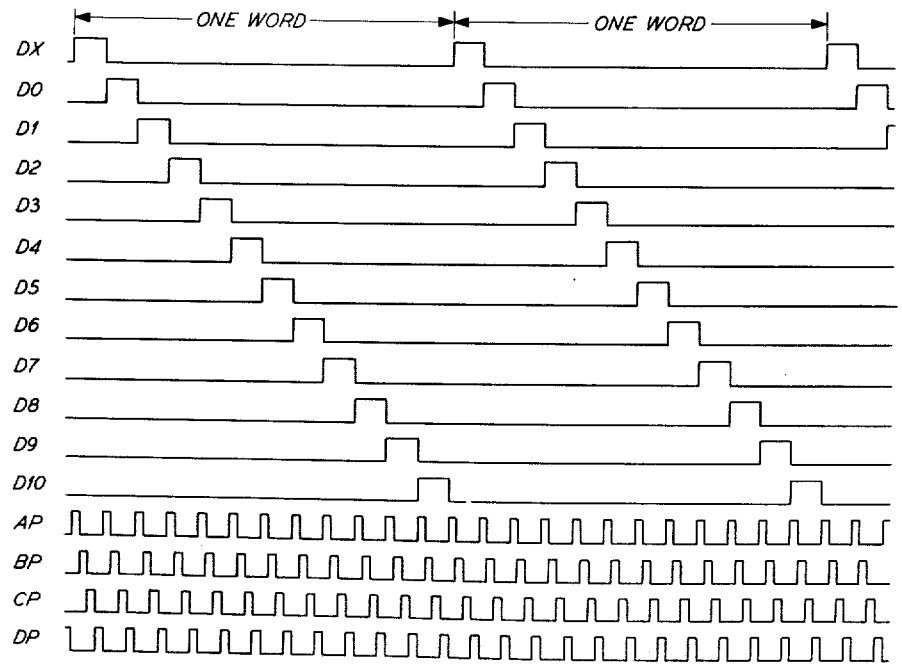
Figure 21:
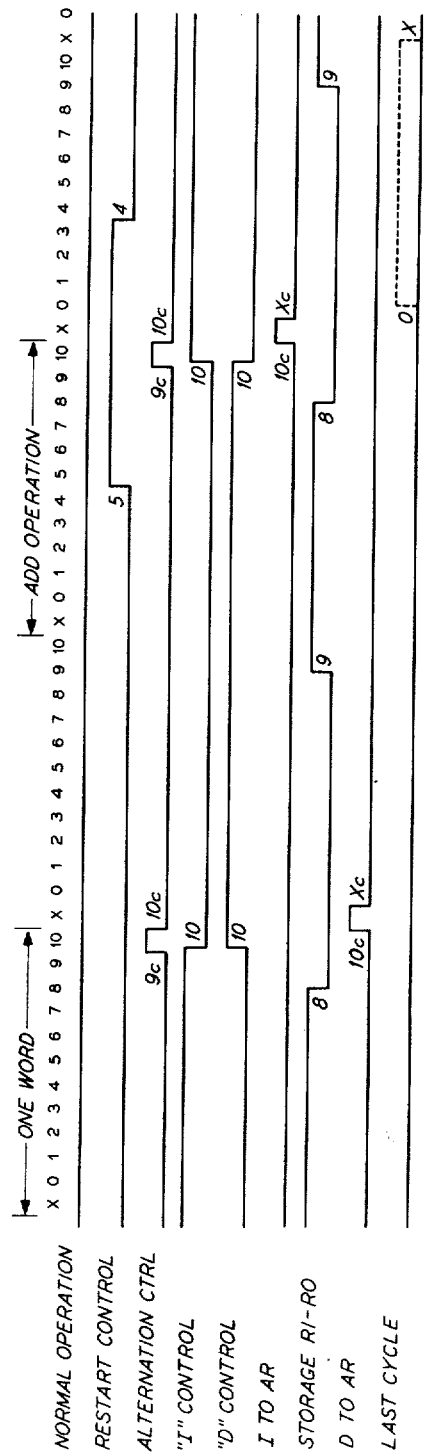

FIGS. 20 and 21 are timing charts.

*General principles and over-all machine concept*

Figure 1:
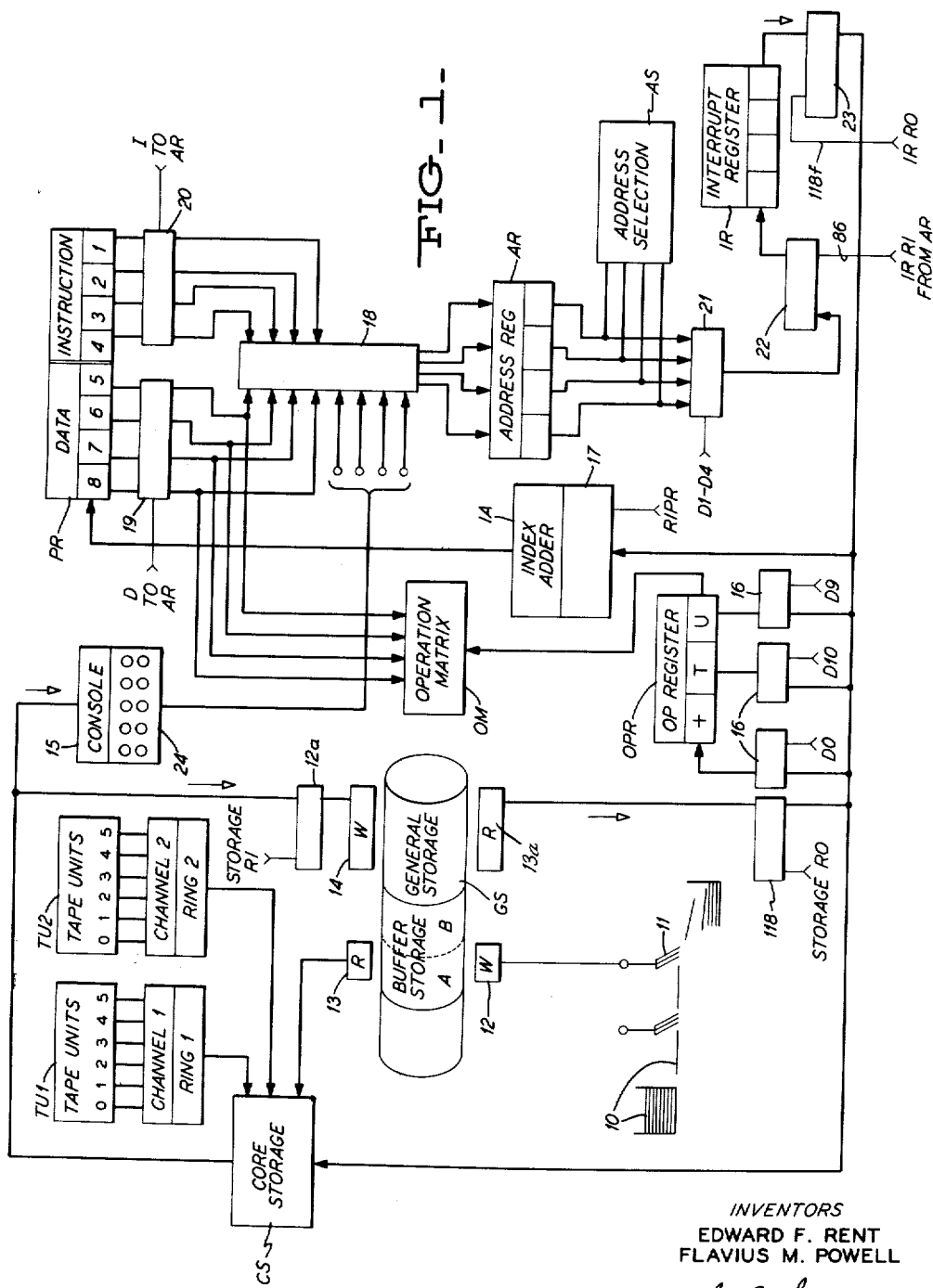
FIG. 1 is a general diagram of the essential components of a stored program type data processing machine embodying the principles of the invention.

In FIG. 1 there is shown a simplified block diagram of only those components of a stored program type data processing machine which are affected by the operation of the present invention. For the sake of brevity, the ensuing general description of the machine system and the necessary components will be brief in nature and it is to be understood that, where necessary, reference may be made to the afore-mentioned application, Serial Number 544,520, for a complete detailed disclosure of any of these components as well as the complete data processing machine.

The machine has a large memory capacity in the form of magnetic drum general storage GS on which may be stored up to 3500 "words." A word consists of up to ten digits and an algebraic sign. Magnetic drum buffer storage A and B is provided between the main storage and the input and output units. For example, as shown in FIG. 1, data information on record cards 10 may be sensed in a card reading machine by reading brushes 11 and the data recorded in buffer storage A of the drum through a write head 12. The data in buffer storage A may be taken out through a read head 13 and placed in a core storage unit CS. It can also be seen that magnetic tape control units TU1 and TU2, for example, may feed tape data through their respective channels C1, C2 and timing rings TR1 and TR2 into core storage. Information in core storage may, for example, be recorded in general storage on the drum through a switch 12a and write head 14 or it may be sent to the control console 15 of the machine. Also, data in general storage of the drum may be taken through a read head 13a and transmitted to other locations in the machine. Of course, it is understood that many different kinds and numbers of input and output devices could be used for transferring information into and out of the drum.

Words are stored serially on the drum. Further, the digits of a word are stored serially within each word interval. Digits are represented by parallel combinations of magnetically stored bits. Information is thus said to be stored serially by word and digit, parallel by bit. The machine uses a "two out of five" bit system, where two of five possible parallel stored bits determine the decimal value of the digit. FIG. 3 shows how the "two of five" system combines different binary "1" indications from two of five parallel devices to represent each of the ten decimal digits.

Each of the word storage positions on the drum is located by a four digit code or "address."

In the stored programming system used by this machine, each instruction (program step) is stored in a word storage location as a ten digit word. The coded digits of an instruction word, when interpreted by the program control circuits, give information as to which operation is to be performed, in which storage location to find the data to be used in performing the operation and in which storage location the next ten digit instruction word is to be found. A stored sequence of such instruction words forms a program or "program routine."

Calculations in the machine are performed by electronic means which will not be shown or described in detail herein since they are not required for an understanding of the present invention. The calculator can add, subtract, multiply, divide and make logical tests such as plus, minus and zero accumulator balance. The program routine can be altered by any of these logical tests or by sensing a control punch in a card. The arithmetic operations, add, subtract, multiply, divide, shift and table look-up are accomplished in general by merging, in a main adder, distributor and accumulator outputs, or their substitutes, or general storage and distributor outputs. These outputs are merged in sequences as specified by the operation and the result is stored back in the accumulator. All of the arithmetical and logical operations are built into the machine and they are activated by the operation code portion of the instruction word.

The arithmetic units of the machine are designed to handle numbers in a serial fashion. Thus during calculations the 10 digit words are processed by the arithmetic units on a digit by digit basis with machine time progressing from the units digit through the highest order digit of a word.

The basic cyclical timings of the machine are therefore related to digit position rather than digit value. In the arithmetic portion of the machine, the value of a digit is determined by simultaneous combinations of bit pulses on two of five parallel information lines.

The general storage portion of the magnetic drum has 3500 addressable locations where ten digit words can be stored. Each of these word positions is located by first determining statically which of a plurality of track bands it is in across the drum and then dynamically which one of a plurality of angular drum positions it occupies. To accomplish head selection the 4 digit address portion of the instruction word is placed in the address register AR where it activates the head selection circuits indicated as AS in FIG. 1. Both the static and the dynamic selection are determined by the numerical value of the 4 digit address in the address register.

All machine timings are related to the angular position of the drum. FIG. 2 shows the various important timing intervals and how they relate to the drum. The drum is divided into 5 sectors and each sector is further divided into 10 word intervals. Each word divides into 12 equal digit intervals, 10 digits, 1 sign position and a separation interval called Digit X (DX) between words. Each digit time is finally divided into four equal intervals A, B, C and D. The size and speed of the drum has been chosen such that it takes 4800 microseconds per drum revolution. Since there are 600 digit intervals around the drum, 1 digit interval equals 8 microseconds and each A, B, C and D pulse is ¼ of a digit time or 2 microseconds.

The buffer storage bands A and B previously referred to are used for readin and readout buffer storage, called read buffer storage and punch buffer storage, respectively. For a detailed showing of how information on punched cards may be read into buffer storage, reference may be had to the application of F. E. Hamilton et al., Serial Number 399,496, U.S. Patent No. 2,877,450 issued March 10, 1959, filed December 21, 1953, and assigned to the present assignee. For a detailed showing of how information may be read out of buffer storage to control, for example, a card punching machine, reference may be had to the application of F. E. Hamilton et al., Serial Number 464,516, now U.S. Patent No. 2,919,429, filed October 25, 1954, and assigned to the present assignee.

The present machine uses a system of stored programming to provide the necessary sequence of operations for the solution of a problem, e.g., the machine refers to any of its own storage locations to obtain a previously stored or computed ten digit, coded, instruction word whose digit values can be interpreted by the machine to determine what its next operation should be.

Original data and instructions are normally stored in drum storage locations from punched cards during the loading process. Additional data and/or instructions may be inserted from cards during the solution of the problem. Each instruction (program step) is stored as a word. Since both data and instructions are stored in the same manner, an instruction word can be subjected to arithmetical operations and thus can be altered by programming. The meaning of any valid coded instruction is built into the machine and any sequence of instructions is called the program routine.

All instructions are in the form of 10 digit words with a sign carried along for checking purposes. It has no effect on the meaning of the instruction, but must be considered when the instruction word is altered arithmetically.

Referring to FIG. 4, it may be seen that the instruction word is divided into three sections. Digit positions 10 and 9 are the operation code which tells the machine which of its several operations to perform on this program step. Positions 8–5 are the data address and usually mean either the location of information to be used in the operation, or the location where the information is to be stored as a result of the operation. Positions 4–1 are the instruction address which indicates the location in storage of the instruction word for the next program step.

FIG. 1 in addition to showing selected functional units also shows paths of program information flow and it should be understood that, although the data flow paths in FIG. 1 are shown as a single line to simplify the illustration, each data flow path actually comprises five parallel lines and that in accordance with the two out of five system, information pulses representing the numerical value of each digit will be present on two of these five lines during each digit interval.

The arithmetical and logical operations of the machine are controlled by program control circuits which comprise a distributor or operation matrix OM, a program step storage unit or program register PR, the operation register OPR, the address register AR, and, in accordance with the present invention, an interrupt register IR. The information flows from the general storage section of the drum and the operational code data is transmitted at digit "0," "10" and "9" times through suitable "and" switches 16 and placed in the sign, tens and units positions of the operation register OPR. The data and instruction portion of the program word enters an index adder IA by way of a readin "and" switch 17 during the occurrence of a readin program signal RIPR. From the index adder the data and instruction information is fed serially into the program register PR. The information is read out of the program register in parallel and into an "OR" switch 18 by way of two "and" switches 19 and 20. The switch 19 transfers the data portion of the word into the switch 18 and address register under control of a D to AR signal and the instruction portion of the word is transferred into the address register under control of the switch 20 and an I to AR signal. From the address register the information is fed into the address selection unit AS and also into an "and" switch 21 which is under control of address register scan signals D1–D4 for transmitting the information out of the address register in serial fashion and into an "and" switch 22. The switch 22 under control of an interrupt register readin signal IRRI serves to enter into the interrupt register IR the same information that is in the address register unless an interrupt condition occurs, as will be explained later. The information in the interrupt register is fed out serially and transmitted to the core storage unit CS by means of an "and" switch 23 under control of an interrupt register readout signal IRRO. It will also be noted with regard to the general flow of information that the data information in the program register is also fed into the operation matrix OM where it is combined with the operational code information coming from the operation register. The operation matrix functions to send signals to the calculator instructing the type of operation which is to be performed and where to perform it in the machine. Also, the main console 15 includes a keyboard 24 which can be used to key information into the switch 18 for entry into the address register.

Each program step is performed in two parts or "half cycles." On the first part or "I" half cycle, the operation, program and address registers are reset and a new instruction word is read into the operation register and program register. Then, the "I" part of the instruction word in the program register is transferred to the address register for interpretation and use by the address selection unit to select the next "I" address. The operation code in the operation register enters the operation matrix. On the second part or "D" half cycle, the address register is reset and the data part of the instruction word in the program register is transferred into the address register where it is interpreted and used to select the "D" address. The data part of the word in the program register is also entered into the operation matrix where it is combined with the operational code data entered therein. The operation matrix interprets the data and develops signals for controlling the machine to carry out the operation called for by the instruction word. This completes a program step.

As soon as the operation is started, program control causes a return to the "I" half cycle. The operation, program and address registers are reset and the next instruction word is read out of the "I" address location and into the program register replacing the previous instruction word and the above sequence is repeated. Interlock circuitry is provided so that a program advance will be prevented, except for read or punch operations, until the previous program step has finished using the arithmetic units of the machine. In this manner the machine advances through the steps of a stored program routine.

This half-cycle action, by which a program step is performed, is accomplished by a program control commutator which controls the sequence of actions necessary to advance through any program step. This control commutator, or alternator, is a two branched ring with several positions in each branch. As it cycles, it alternately advances through each branch. The positions of one branch control the functions of the "I" half cycle, while the positions of the other branch control the functions of the "D" half cycle. Normally the ring must advance through both branches, first "I" then "D," to complete a program step. The outputs of the steps of the control commutator are used to control the various transfers of data required for the accomplishment of the program step.

The program and interrupt registers are of the shifting register type such as is fully disclosed in the application to G. J. Saxenmeyer, Serial Number 669,821, filed July 3, 1957, and assigned to the present assignee. These registers take the form of a latch ring circuit wherein each stage constitutes a storage device which includes a pair of inverters, a cathode follower for providing the output, a pair of diodes arranged as a voltage coincidence switch for latching the stage "on," and a third inverter, coupling one stage to the next, and which serves as a storage medium for the information during shifting operations of the ring. This type of register is capable of serial entry such as required for readin of the instruction from its reference location in addressable storage elsewhere, serial readout such as is required to permit indexing of instructions, and parallel readout such as is required for operation of operation code matrices and address selection matrices by instructions directly from the register. Information in these registers may be read out statically in parallel or dynamically in serial form.

The operation and address registers are static storage units with each position using five latches (electronic binary storage device) to indicate the data code value in two out of five form. Once a code is entered, continuous steady state output is available from two of the five latches until the register is reset.

The index adder IA is a diode and tube unit capable of receiving two input digit values, analyzing them, and producing a digit output signal equal in value to the sum or difference of the two input values. Regarding the present invention, it can be assumed that the index adder combines the data and instruction portions of the word being transmitted to the program register with machine originated zeros and that the instruction word transmitted is not modified.

The core storage unit CS is available with a total capacity of 1000 words and since all words are individually addressable, data or an instruction can be stored in any core storage word. The core array is a parallel operating device with a readin/out of 55 bits per single access and information is stored in cores in the two out of five code. The core storage is used generally for the assembly of information for writing on magnetic tape and all records read from tape enter this storage. The core storage unit is equipped with 3 timing rings, each ring having access to the entire core unit. One of the rings (not shown) connects the core unit with the drum and is specifically associated with the compute function of the machine. Each one of the other two, designated ring 1 and ring 2, is associated with a tape control channel.

As shown in FIG. 1, the machine can be equipped with twelve magnetic tapes, each tape unit TU1 and TU2 comprising six tape drives. The control channels 1 and 2 permit each unit to operate independently and as a result simultaneous read-read, read-write or write-write tape operations are possible. All tape operations are initiated by a single operation code and its associated D-address. The D-address controls the tape unit to be used, the channel to be used, the tape operation (read, write, backspace, etc.) to be performed and the mode of operation to be assumed after the command has been executed.

The control console 15 and associated keyboard 24 contains switches and lights through which the operator may observe and control the operation of the machine. In connection with programming, the console is provided with a plurality of storage entry switches. Any instructions or ten digit signed number may be set on these switches. They are used in conjunction with other keys and switches on the console to enter data or instructions into any storage location and are generally used to enter corrections when correcting a program. They may be consulted by the program by using the address 8000. Address selection switches are also provided and which may be used to set an address at which a program is to be stopped or to enter an address directly into the address register. Program start, stop and reset operations may also be controlled from the console.

The basic functional electronic circuits used in the machine are relatively few and simple. Triode tubes, cores and germanium crystal diodes are used and tubes are used functionally as inverters, double inverters and cathode followers. Inverters and cathode followers are connected by external circuitry to form a "latch" circuit. Latches are used rather than triggers where a momentary signal must be stored for later use and in timing ring circuits.

The logical circuits of the machine make extensive use of germanium crystal diodes arranged to act as positive signal AND circuits and positive signal OR circuits. Hereafter, to avoid confusion due to multiple usage of the terms AND and OR, AND circuits will be referred to as switches, and OR circuits will be called mixes.

The most common tube functions are single inverters and cathode followers. These are shown as a square block with grid input on the left and anode or cathode output from top or bottom as the case may be. FIG. 13 shows a simple type of cathode follower and FIG. 13a shows the block symbol used to represent the cathode follower of FIG. 13. FIG. 14 shows a typical type of single inverter tube that may be used. The block symbol for a single inverter is shown in FIG. 14a.

A twin triode is also used with one half of the tube functioning as an inverter amplifier and the other half as a cathode follower. FIG. 15 shows the block symbol used to represent an inverter follower.

Latches are used in the present machine, and these are made up of a double inverter and cathode follower, usually with a diode switch or mix input to the latch circuits. Thus a latch symbol is an In rectangle and a CF square joined as shown in FIGS. 16 and 17. Inputs are shown as either entering the left side or at the bottom, near the left side, of the IN rectangle.

A diode switch is a circuit wherein the coincidence of two or more signals is required to produce an output. FIG. 18 shows a pair of diodes connected to form part of a switch for operating with positive going signals. The block symbols used in the wiring diagrams to represent the circuit of FIG. 18 are shown in FIGS. 18a and 18b.

A diode mix is a circuit wherein the appearance of a signal on any one or more inputs will produce an output. FIG. 19 shows a pair of diodes connected to form part of a mix circuit for operating with positive going signals. The block symbols used to represent the circuit of FIG. 19 are shown in FIGS. 19a and 19b.

Thus far there has been described briefly some of the functional units and operating principles of a stored program type data processing machine. The general machine system is known in the computing art and in the interest of simplicity only those functional units which enter into the operation of the present invention have been discussed and discussion of other functional units of the machine such as accumulators, table look-up, translators, and the like has been purposely omitted.

The description to follow will relate specifically to the logic and operation of the novel program interrupt controls as applied to a machine of the foregoing nature.

*Program interrupt*

In accordance with the present invention, the data processing machine has been provided with novel program control features which will allow, for the first time, a main program routine to be automatically interrupted and an independent program routine or interrupt routine accomplished after which the machine is returned to the main program routine at the point of interruption.

Interrupt operations are under program control and there are two drum buffer interrupts A and B, relating to the A and B buffer storage bands respectively on the drum, and two tape control interrupts 1 and 2, relating to the tape units TU1 and TU2 respectively.

The drum buffer interrupts are under control of switches on the console and upon the setting of a switch, the programmer can call for a drum buffer interrupt input-output command. This means that at the completion of a particular card operation the machine processing the record cards will automatically signal an interrupt to occur. The first instruction of the drum buffer routine will be taken from an address set in switches on the console. The completion of the interrupt routine is signaled by a release interrupt command and, upon the occurrence of this release command, the machine will revert to the instruction of the main routine at the point of interruption. In this connection, it should be noted that the return point in the main routine which the interrupt program started will always return to the address in the interrupt register if the interrupt register is addressed. At the end of the routine when the interrupt is released, if the I-address of the release interrupt instruction is 3607, which is the address of the interrupt register, then the machine will return to that point in the main program at which interruption occurred. Otherwise, any other I-address will return the machine to some other point and contact will have been lost with the main program.

The tape controlled interrupt differs from the drum buffer interrupt in that the first instruction is taken from a specified address in the core storage unit. For example, an address of 4000 is used for tape control 1 and 4010 for tape control 2. These instructions will have been placed in these locations automatically by the machine and they are called tape controlled status words. These status words are stored in these locations at the completion of the last tape instruction. When these words are used as an instruction, they will specify subroutines depending upon the units digit in the I-address of the status.

The machine is interlocked such that only one interrupt may be processed at a time. Any other interrupt signals which occur are stored in stacking latches and will be processed according to a priority circuit. Regarding the priority system used, drum buffer A and drum buffer B have addresses of 3609 and 3610 respectively with drum buffer A having the highest priority of all the interrupts. Drum buffer B, tape control 1 and tape control 2 then follow in that order of priority.

In connection with drum buffer storage, the record card reading machine, which is loading data into buffer storage from the well-known type of record card which bears the twelve rows of index point data positions 9, 8, 7 . . . 11, and 12, may be simply set so that when a card is feeding "9" edge first, the reading of the "12" index point position of the card indicating that the card has been loaded into buffer storage, will cause the machine to send out a signal which may be used as an interrupt signal by the programmer.

For a tape write operation, the tape control interrupt signal is initiated upon the coincidence of the start and stop address in the timing rings 1 and 2 associated with the core storage unit. In the case of a tape read operation, the tape control unit recognizes the end of a record by the absence of data to initiate an interrupt signal. However, these tape interrupt signals will not be sent until after the tape status word has been stored in the core storage unit.

The card input-output interrupt feature makes it possible to operate a card input, card punch, or printed output device on an interrupt basis. The input or output unit to be operated on interrupt basis is manually selected by a nine position switch on the console and two sets of switches are provided, making it possible to operate two units on an interrupt basis. No special interrupt operation codes are required for card input-output operations. Instead, the selected unit operates on an interrupt basis whenever it receives an operation command unless the interrupt subroutine uses a tape unit.

If the input interrupt subroutine does not involve tape operations, the interrupt signal occurs as soon as the input area is filled by the card reading device attached to it. If the input interrupt subroutine does include tape operations, the interrupt signal will occur only when the input area is filled by the card reading device and the tape unit channel used in the subroutine is free. If an output interrupt subroutine does not include tape operations, the interrupt signal is available when the information in the output area is completely transferred to the attached output device. If the output interrupt subroutine does contain tape operations, the interrupt signal will only be available when the information in the output area is completely transferred to the attached output device and the tape unit channel used in the subroutine is free. The delay of the interrupt signal until the required tape unit channel is free is under control of a console switch.

After the interrupt signal has been received, the I-address of the instruction being executed has been stored in the interrupt register, control has been transferred to a set of manually settable switches on the console which contain the first address of the interrupt subroutine, and the card interrupt routine has been completed, a programmed release interrupt command (−02) is given with an I-address (3607) of the interrupt register to return from the interrupt routine to the main routine. In addition, it is necessary to reset the condition that caused the interrupt and this is the function of the D-address of this command. The condition to be reset is specified by the 10's position. The units and hundredths positions are unused and may be any value 0–9. The thousandths position must be zero.

| D-Address | Condition Reset |
|---|---|
| 0X0X | Card Interrupt switches (3090). |
| 0X1X | Card Interrupt switches (3610). |
| 0X2X | Tape channel 1. |
| 0X3X | Tape channel 2. |

When the tape units TU1 or TU2 are being employed by the machine, all tape operations are initiated by a single operation code and its associated D-address. A tape instruction is a +80 operation code with a data address interpreted as follows:

| Thousands | Hundreds | Tens | Units |
|---|---|---|---|
| 0—No Interrupt | 0—Read | 1—Tape Control 1. | 0 |
| 1—Interrupt | 1—Write | 2—Tape Control 2. | 1 |
| 2—Alpha Interrupt | 2—Backspace | | 2 |
| | 3—Write End of File | | 3 |
| | 4—Rewind | | 4 |
| | 5—Turn off End of File | | 5 |
| | 6—Forward file space | | |
| | 7—Rewind Unload | | |
| | 8—Write Delay | | |
| | 9—Backspace File | | |

The units digit indicates the tape drive to be used. The tens digit indicates the tape channel to be used. The hundreds digit indicates the operation to be performed and the thousandths digit indicates the mode of operation. Operations which may cause a tape control interrupt are (1) forward file space (2) backspace file and, providing a 1 or 2 is in the thousands position of the D-address of the +80 command, interrupt will be caused from read, write and write delay. Conditions created as a result of a tape motion which can cause a tape control interrupt are (1) SLR (short length record) (2) LLR (long length record) (3) EOF (end of file) and (4) Error.

*Interrupt operation*

An interrupt operation will now be developed with reference to FIGS. 5a and 5b which comprise a general outline of the logic circuits for carrying out interrupt operations. It is to be understood that FIGS. 5a and 5b are intended to show only the general flow of logic and to establish the sequence of events which make up an interrupt operation. The detailed logic circuitry for the outline is shown in FIGS. 6 through 12 and will be discussed later.

This discussion will presume that the machine is operating with a card buffer in the interrupt status and further that card buffer A is being used so that the switches on the console, which are associated with drum buffer A, will be the switches to which will be addressed the interrupt routine.

Referring to FIG. 5a, an interrupt signal from a record card machine is received from the card machine control circuitry and this signal is transmitted via line 30 through a mix 31 to set a stacking latch associated with drum buffer A. The signal sets the stacking latch on and upon the completion of the operation code in process at the time the stacking latch is set, and assuming that no errors exist in the machine, the machine will develop an automatic interrupt test signal from a switch 33. Switch 33 is activated by the coincidence of a no trace signal on line 34, a restart to "I" signal on line 35, and a no interrupt mode signal on line 36.

This interrupt test signal is common for all types of interrupt and it always occurs at the end of the D-half cycle and during the restart to "I" word time at which time a digit 8 pulse and a digit 8 "C" pulse are fed into a switch 37 on lines 38 and 39, respectively. Coincident with these pulses there is a normal operation signal on line 40 and an output signal is developed on line 41. The interrupt test signal feeds through a mix 42 and switch 43 to bring up a drum buffer A interrupt test. This interrupt test signal is conditioned by the drum buffer A stacking latch "on" signal on line 45. When the switch 43 is up, the drum buffer A interrupt test signal on line 46 will feed a mix 47, the output of which goes to turn on an interrupt delay latch.

The interrupt delay latch output will, via line 48 and a mix 49, hold off storage readin and readout so that while in the I-half cycle information will be prevented from being transferred from storage to the program register and will allow at this time the transfer of the I-address to the interrupt register. This I-address is the return point to which the main program can be connected at the end of the interrupt routine.

Now a series of timers are started in order to determine whether as a result of the last operation any errors occurred. An error timer latch is turned on from the output of a switch 50 which will be up upon the coincidence of a last cycle pulse on line 51, a D10 pulse on line 52 and an interrupt delay latch signal on line 53. The interrupt delay latch was turned on by the drum buffer A test signal from the mix 47. The error timer latch will stay on if there are no errors and, assuming no errors, the error timer delay latch will be turned on. Since the I-half cycle normally overlaps the last word of the D-half cycle, there must be established about three word times of delay from the time of the interrupt signal until the interrupt routine is entered. This delay allows for the set up of addressing means in the interrupt system or interrupt controls for reading the interrupt address from the console into the address register after the address register has been transferred to the interrupt register.

A switch 54, upon the coincidence of an error timer latch signal on line 55, an interrupt delay latch signal on line 56, and a D9 pulse on line 57, will turn on an error timer delay latch. This is simply a delaying circuit that allows any errors which may have developed to come in and turn off all the interrupt controls. As long as no errors develop, the error timer delay latch will turn on. With the error timer delay latch on, a signal is fed via line 58, to a switch 59 along with the interrupt delay latch signal on line 60 and a no interrupt error signal on line 61. Switch 59 develops an interrupt test signal second. The interrupt test signal second on line 62 coincident with a latch signal from the stacking latch associated with the interrupt which had the highest priority on line 64 (in this case the drum buffer A stacking latch will be on) will develop a drum buffer A interrupt test signal to turn on the drum buffer A interrupt latch. The drum buffer A interrupt latch (FIG. 5b) will be turned on by switch 65 (FIG. 5a) when the drum buffer interrupt test signal is present on line 66 and the error timer latch signal on line 67 is up. The interrupt latch will come on with the second test signal and will remain on until the following digit 8 time. The interrupt test signal is a digit 8 "C" pulse. The reset pulse signal is a straight digit 8 so that the interrupt latch will be on for one word time. The drum buffer A interrupt latch identifies address 3609 on the console, the drum buffer A interrupt latch signal on line 68 (FIG. 5b) combining with a D5 pulse on line 69 to develop an output from switch 70 which will heat up or cause the console switches to read out to the address register. The address register readin signal on the output line 70a of switch 70 is fed through a mix 70b and to a switch 70c. A C–A pulse on line 70d and a D5 pulse on line 70e will develop a switch output signal on line 70f which is used to reset the address register preparatory to receiving the new address.

The drum buffer A interrupt latch signal on line 71 feeds a mix 72 which also receives the interrupt latch signals associated with drum buffer B on line 73, tape control 1 on line 74 and tape control 2 on line 75. Mix 72 develops an interrupt signal on line 76 which combines with a D9 pulse on line 77 to develop a signal on the output line 78 of switch 79. This signal turns on the interrupt mode latch.

The interrupt mode latch is one of the conditions blocking the input to the interrupt register. As will be seen later, as soon as the interrupt mode latch is turned on, the off side will go down to inhibit any further entry to the interrupt register. With entry to the interrupt register inhibited, the operation now moves to the interrupt routine designated by the address contained in address 3609. Placing the address 3609 in the address register places the starting address of the interrupt routine in the address register and machine operation may now move into the interrupt routine.

A switch 80 is shown conditioned by a no interrupt mode signal on line 81, an I control signal on line 82, a D1 pulse on line 83 and an interrupt interlock on signal on line 84. This is the normal control for entering the interrupt register during every I cycle, if we are not in an interrupt routine. The output from switch 80 turns on a latch 85 which controls reading into the interrupt register from the address register. The output from latch 85 is called the IRRI signal and this signal, via line 86, is used to gate the information reading out of the address register through the switch 22 and into the interrupt register, as shown on FIG. 1. In an interrupt routine the no interrupt mode signal will be down and we will not be able to bring switch 80 output up. Accordingly, latch 85 will be off and the address register cannot be read into the interrupt register. This is the tie-back to the main program.

The interrupt routine in process will continue until such time as the operator or programmer has decided that he has performed all the operations necessary for the interrupt routine. It is now necessary to release the machine from the interrupt status. There will be programmed, then, a release interrupt code which, with its D-address, will release or reset the stacking latch associated with that address. Assuming the release interrupt code —02 is programmed with the proper D-address 0X0X, the drum buffer A stacking latch will be reset and the interrupt mode latch turned off. The machine will then revert back to its normal status. With the interrupt mode latch off, the next I-address from the address register will be free to enter the interrupt register.

However, during the release interrupt command itself, it is possible to have another interrupt signal occur at precisely the same time as the releasing of the first interrupt. Under this condition, the interrupt register should not be released and a new address entered but, instead, the old address should be retained in the interrupt register and a second interrupt routine started. This is accomplished in the switch 87, shown on FIG. 5a. If we are releasing interrupt and a stacking signal had been developed such that the stacking line 88 is up, switch 87, further conditioned by a D9 pulse on line 89 and an operation readin signal OPRI on line 90, will be turned on and the switch output on line 91 will turn the off side of an interrupt interlock latch "on." With the interrupt interlock switched, then the interlock on line 86 (FIG. 5b) will be down and consequently will hold switch 80 down. Consequently, the IRRI signal will be down and no further transfers will take place from the address register to the interrupt register.

The operation will now process on a priority basis any interrupts in waiting in the stacking latches. Assuming for purposes here that an interrupt from drum buffer B signal was received coincident with the release command for drum buffer interrupt A, then drum buffer interrupt A will be released and the circuits just described will set up a test for drum buffer B, turn on the interrupt delay latch, turn on the error timer, turn on the error timer delay and finally turn on drum buffer B interrupt latch. The drum buffer B interrupt latch identifies address 3610 on the console and as such will cause the console switches to read out address 3610 to the address register. Also, the interrupt mode will be turned on and transfers from the address register to the interrupt register will be blocked. The interrupt operation proceeds to the address or the program stored in the address specified by 3610.

There has been described thus far the logic sequence for a complete interrupt operation, with particular reference to a drum buffer interrupt. The same operation sequence will take place in the case of tape control interrupts 1 and 2.

The detail logical circuits for interrupt operation are shown on FIGS. 6 through 12. In the discussion of these circuits, like reference numerals will be applied to the circuit lines and to those elements which appear in block form on FIGS. 5a and 5b.

Reference should also be made to the timing diagrams shown in FIGS. 20 and 21.

FIG. 8 shows the circuits for setting the stacking latches and for developing the interrupt test signals. The machine signal from the card reader comes in on line 30 and feeds through mixes 31 and 31a to turn on the drum buffer A stacking latch 31b. Although not shown, a similar circuit is provided for receiving a signal associated with drum buffer B and setting a drum buffer B stacking latch. In connection with the tape control 1 stacking latch 31c and the tape control 2 stacking latch 31d, it is possible to have the interrupt signal from the tape control units at any digit time within the word and, since the machine switches the interrupt test signals at a digit 8 "C" pulse time, means must be provided to prevent the tape control stacking latches from setting at digit 8 time. The fact that the machine could have gone through the first test sequence and back to the second test sequence at the same time that a stacking latch for tape controls was being set would result in two interrupt conditions being set up at the same time. To prevent this, the tape control 1 and 2 interrupt signals are switched at 31e and 31f, respectively, against a negative digit 8 pulse from the inverter follower 31g. As a result, the tape control stacking latches cannot be set at digit 8 time. However, the interrupt signal is at a minimum two digits long and the latches can be set at digit 7 or digit 9 time. The outputs from the stacking latches feed through a mix 31h and cathode follower 31i to develop a stacking signal on the line 88. The stacking latches are reset by the release interrupt code (—02) and the D-address of the associated stacking latch. For drum buffer A, the reset is accomplished under control of the OPRI signal, D1 pulse, ARTN1 and ARTN2 signals, switches 31ii, 31jj and mix 31a. Signals ARTN1 and ARTN2 indicate bits 1 and 2 (decimal 0) in the tens position of the address register. The stacking signal (FIG. 9) drives the switch 87 up to turn on the interrupt interlock latch 31j and develop the interrupt interlock signal on line 91.

FIG. 6 shows the circuits for developing the interrupt test signals, the error timer signal and the interrupt delay signal. At the top of FIG. 6, the no trace, restart to "I" and no interrupt mode signals can be seen feeding switch 33 and the mix 42 which is further switched against a digit 8 pulse, a digit 8 "C" pulse and a normal operation signal. This develops from cathode follower 92 the interrupt test signal first. The no trace signal is developed in the automatic program of the machine and the normal operation signal is developed from a "run" button on the console and this signal will be up as long as the machine is in normal operate status and there is no error.

The interrupt test signal gates a switch 43 (FIG. 8) which in turn clamps off a mix 94 so that when operating a drum buffer with a tape control unit the interrupt signal will not be processed until the tape control unit operating with the drum buffer has completed its cycle. This is accomplished by drum buffer A and B switches on the console. FIG. 8 shows only the drum buffer A console switch. It is possible to operate drum buffer A with tape control 1, tape control 2 or an immediate status. Operating with tape control 1 signal, which gates a switch 95, the test signal developed at point 96 will not be allowed to bring up the cathode follower 97. The reason for this is that tape control number 1 interlock signal, which gates the other half of switch 95, will be down as long as that tape control unit is operating. As soon as the tape control unit has completed its operation, the tape control 1 interlock signal will rise causing switch 95 to turn on. The drum buffer A test signal can now be developed from point 96 and cathode follower 97. Although not shown, similar circuitry is provided for developing drum buffer B, tape control 1 and tape control 2 interrupt test signals. Such signals are shown feeding the mix 47 on FIG. 5a.

Returning to FIG. 6, it can be seen that if any one of the interrupt test signals feeding mix 47 is up, the interrupt delay latch 98 will be turned on. The interrupt delay latch will remain on until the machine goes into an interrupt mode and will allow timing delays in order to test for errors from the preceding D-cycle. The delay latch is reset by a D10 pulse and an interrupt mode signal through the switch 98a and inverter follower 98b.

With the interrupt delay latch on, line 53 will be up along with last cycle pulse line 51 and D10 pulse line 52. Last cycle means that the calculation in process in the calculator has finished or will finish very shortly and will be completed at the next digit X time which is only eight microseconds away. Accordingly, switch 50 will develop a signal turning the error timer latch 99 on. The error timer allows for checking of this operation for errors and it is reset under control of a D10 pulse, an A.-C. pulse, switch 99a and the inverter follower 99b. If there are no errors, the error timer latch output feeds via line 55 to switch 54, shown on FIG. 7. The interrupt delay latch output on line 56 and a D9 pulse on line 57 effects an output signal from switch 54 which turns on the error timer delay latch 100.

The error timer delay latch signal on line 58 is fed to the switch 59, shown on FIG. 6. No interrupt line 61 and interrupt delay latch output line 60 are up allowing switch 59 to come up indicating that there are no errors, that the necessary delay was accomplished and that the interrupt test signal second may now be developed from switch 59, mix 42 and the cathode follower 92. Interrupt test signal second will, through the switching previously described on FIG. 8, develop the interrupt test signal for drum buffer A or for which ever unit is involved. The error timer delay latch will reset off under control of the interrupt signal, D9 pulse, switch 100a and inverter follower 100b.

The interrupt test signals are shown on FIG. 7 and, if these signals come up as the machine goes through the procedure of testing for errors and has established that a priority tape control unit associated with a drum buffer is free, the machine will be ready to go into an interrupt condition. The error timer delay 100 was latched on bringing line 67 up and, assuming that the drum buffer A test signal is up, switch 65 will come up to turn on the drum buffer A interrupt latch 103 and develop the drum buffer A interrupt signal on line 71. The other interrupt signals are developed in the same manner. The switches 104a—104f and mixes 105a—105d make up an interrupt error checking circuit. If more than one interrupt latch is on at a time, the checking circuit will deliver an output to switch 106. Switch 106 is gated by a D9 pulse on line 107 and when the switch comes up, the no interrupt error latch 108 will switch to develop a negative no interrupt error signal on line 61. A negative no interrupt error signal will prevent the switch 59 (FIG. 6) from developing the interrupt test signal second. The interrupt latches are reset through the switch 103a and cathode follower 103b.

FIG. 9 shows the drum buffer A interrupt signal gating the switch 70 to turn on the latch 109 which controls the scanning of the switches at 3609 on the console for the address of the interrupt routine associated with drum buffer A. This latch remains on from digit 5 to digit 9. An interrupt mode latch 110 is also turned on by switch 79 and develops a negative signal on no interrupt mode line 111 and a positive signal on interrupt mode line 112. As previously described, the no interrupt mode signal, when down, will inhibit any further transfers of the I-address from the address register to the interrupt register. Additionally, the interrupt mode signal will, via lines 113, 114 and mix 115, turn off the interrupt interlock 31j. The interrupt mode latch is reset by the OPRI signal, D3 pulse, switch 110a and mix 110b.

FIG. 11 shows the interrupt delay latch signal feeding mix 49 and inverter follower 116 to hold the storage readin and readout latch 117 in the off condition. As a result, switch 118 (FIG. 1) will be down to prevent reading from storage into the program register during the I-half cycle. During the I-half cycle, the machine attempts to transfer a new instruction to the program register. However, for an interrupt routine, the instruction to be transferred to the program register is the one specified by the address activated by the interrupt signal. As previously mentioned, drum buffer A activates address 3609. As soon as the interrupt delay latch is released, the storage readin and readout latch will come on with normal program control. The address specified by 3609 will have its contents transferred to the program register and the machine will be in the interrupt routine.

FIG. 12 shows the circuitry for developing the interrupt register readout signal. The interrupt register has an address of 3607. When received, this address signal is fed through inverter 118a, inverter-cathode follower 118b, and into a switch 118c which is gated by an A pulse. The output of switch 118c feeds mix 118d and turns on the IRRO latch 118e to develop an IR Regen. and IRRO signal on line 118f. As shown on FIG. 1, the IRRO signal gates the switch 23 and, thus, at the end of the routine when the interrupt is released, if the I-address of the release interrupt instruction is 3607, the contents of the interrupt register will be read out through switch 23 and transmitted via the index adder back into the program register to return the machine to the point in the main program at which the interruption occurred.

Referring to FIG. 9, there will be seen the signals set AR to 40X0, XX1X and XX0X. These signals are concerned with a tape control interrupt. Tape control interrupt number 1 has a tape interrupt address of 4000. Addresses 40X0 and XX0X will store 4000 in the address register. A tape control 1 interrupt signal on line 119 with a digit 5, 6 and 7 pulses on line 120 will drive switch 121 up to develop the 40X0 and XX0X address signals. Tape control interrupt number 2 has its tape interrupt address at 4010. In similar fashion, a tape control 2 interrupt signal, by means of a switch 122 and cathode follower 123, will develop the 40X0 and XX1X signals to store 4010 in the address register.

As was previously pointed out, tape interrupt signals are developed as a result of tape motion. For example, at the time that a reel of tape is placed in service, a metallic reflective spot is manually placed near the front of the tape and the end of the tape. This end-of-file reflective spot is sensed automatically, only when writing, to indicate that the tape record being written is the last record to be written. The normal procedure, then, is to follow the last tape record with a recorded tape mark. This tape mark is used when reading to indicate that the end of the tape has been reached. The sensing of the reflective spot when writing or the tape mark while reading sets up an end-of-file condition and this condition results in an automatic interrupt of the main routine and the transfer of control to location 4000 or 4010 depending upon the tape control unit being used.

Fixed length records are read into the core storage unit by first setting the associated timing ring to agree with the number of words in the tape record. If a tape record is read which has fewer words than the setting of the timing ring, an inter-record-gap will occur before the timing ring stop point and an automatic interrupt will be signalled indicating a short length record condition. If the tape record is short by a partial word or a number of complete words and a partial word, the control transfer is to a tape error routine. It the tape record is read which is longer than the designated area of core storage, core locations will be filled only to the setting of the timing ring stop point. However, the tape record will continue to be read until the inter-record-gap is reached at which time a long length record interrupt is signalled.

A program interrupt can be performed on tape read-write operations or card input-output operations. For example, tape interrupt can be used to inspect a master tape for activity in a file maintenance operation while the computer is processing a card application. Upon completion of the tape read operation, the automatic interrupt transfers control to the proper subroutine to determine the tape record activity. The last instruction of the subroutine returns control to the card application at the exact point at which it was interrupted.

To summarize the general operation of the machine embodying the principles of the present invention, as heretofore described, in normal operation the I-cycle will cause the I portion of the program register to be placed sequentially into the address register and the interrupt register. When an interrupt signal occurs, the machine operation proceeds as follows:

(1) Complete the arithmetic operation in progress.
(2) Transfer contents of applicable address (console switches or core storage) to address register.
(3) Block all transfers of I-address to the interrupt register until the interrupt condition is released.
(4) Block execution of any new interrupt signal until the interrupt condition is released.
(5) Execute required routine (location specified by address in console switches contains first instruction of routine; tape interrupts refer to specified words 4000, 4010 in core storage for first instruction).
(6) Cause a release from interrupt condition (by a programmed release interrupt command).

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a data processing machine of the type controlled by stored program steps each comprised of manifestations of data comprehending the operation to be performed and the address of the next succeeding program step, the combination comprising, an address register for receiving the address data from successive program steps, means controlled by the address register for advancing the machine through a main sequence of operations in accordance with said program steps, an auxiliary storage device, means for transferring each data address entered in the address register into said storage device during the main sequence of operations, program interrupt means for automatically interrupting said main sequence of operations, means controlled by said interrupt means for blocking any further entry of data into said storage device, stored program control means controlled by said interrupt means for entering address data into said address register to cause the machine to advance through an independent sequence of operations, and means for transferring the address data stored in said storage device back into said address register at the end of said independent sequence of operations to return the machine to the point in the main sequence of operations where the interruption occurred.

2. In a data processing machine of the type controlled by stored program steps each comprised of manifestations of data comprehending the operation to be performed and the address of the next succeeding program step, the combination comprising, an address register for receiving the address data from successive program steps, means controlled by the address register for advancing the machine through a main sequence of operations in accordance with said program steps, an auxiliary storage device, means for transferring each data address entered in the address register into said storage device during the main sequence of operations, program interrupt means for automatically interrupting said main sequence of operations, means controlled by said interrupt means for disabling said transferring means to block any further entry of data into said storage device, means controlled by said interrupt means for identifying a program step location in storage and for entering the address data of same into the address register whereby the machine is caused to advance through an independent sequence of operations, and means controlled by the last program step of said independent sequence for disabling said interrupt means and rendering said transferring means operable to transfer the address data in said auxiliary storage device back into the address register to return the machine to the point in the main sequence of operations where the interruption occurred.

3. In a data processing machine of the type controlled by stored program steps each comprised of manifestations of data comprehending the operation to be performed and the address of the next succeeding program step, the combination comprising, an address register for receiving the address data from successive program steps, means controlled by the address register for advancing the machine through a main sequence of operations in accordance with said program steps, an auxiliary storage device, means for transferring each data address entered in the address register into said storage device during the main sequence of operations, a plurality of input devices for supplying data to said machine, program interrupt means called into operation by a signal from one or more of said input devices for interrupting said main sequence of operations, means controlled by said interrupt means for disabling said transferring means to block any further entry of data into said storage device, means controlled by said interrupt means for identifying a program step location in storage associated with the input device from which said signal was received and for entering the address data of said program step location into the address register whereby the machine is caused to advance through an independent sequence of operations, and means controlled by the last program step of said independent sequence for disabling said interrupt means and rendering said transferring means operable to transfer the address data in said auxiliary storage device back into the address register to return the machine to the point in the main sequence of operations where the interruption occurred.

4. In a data processing machine of the type controlled by stored program steps each comprised of manifestations of data comprehending the operation to be performed and the address of the next succeeding program step, the combination comprising, an address register for receiving the address data from successive program steps, means controlled by the address register for advancing the machine through a main sequence of operations in accordance with said program steps, an interrupt register, means for transferring each data address entered in the address register into said interrupt register during the main sequence of operations, a plurality of storage devices each capable of receiving a programmed interrupt signal, means operable to test said storage devices to determine the presence of an interrupt signal, a first latch means controlled by the presence of an interrupt signal during operation of said testing means for identifying a program step location in storage and for effecting entry of the address data of said program step location into the address register whereby the machine is caused to advance through an independent sequence of operations, and a second latch means controlled by said first latch means to disable said transferring means and block entry into said interrupt register.

5. A data processing machine as defined in claim 4 and including switching means controlled by said second latch means to prevent further testing of said interrupt signal storage devices during said independent sequence of operations.

6. A data processing machine as defined in claim 4 and including program release control means effective at the end of said independent sequence of operations to reset said first and second latch means such that the testing of said storage devices is resumed and said transferring means rendered operable, and a third latch means controlled by said program release control means for effecting transfer of the data address in said interrupt register back into the address register whereby the machine is returned to the point in the main sequence of operations where the interruption occurred.

7. A data processing machine as defined in claim 6 wherein there is provided an interlock latch means operable to disable said transfer means and block entry into said interrupt register in the event that an interrupt signal is received coincident with the operation of said program release control means, or that other interrupt signals are in storage at the time said program release control means becomes effective.

8. In a data processing machine of the type controlled by stored program steps each comprised of manifestations of data comprehending the operation to be performed and the address of the next succeeding program step, an address register for receiving the address data from successive program steps, and means controlled by the address register for advancing the machine through a main sequence of operations in accordance with said program steps, the combination comprising, an interrupt register, means normally operable to transfer address data entered in said address register into said interrupt register, a plurality of input devices for supplying data to said machine, a plurality of stacking latches each settable by an interrupt signal from an associated one of said input devices, a first test signal means for detecting the condition of said stacking latches, means controlled by coincidence of said first test signal and a set stacking latch for developing an interrupt delay signal, means conditioned by said interrupt delay signal during normal operation of the machine for developing a second test signal, an interrupt latch set upon coincidence of said second test signal and a set stacking latch, means controlled by said interrupt latch for identifying an address location in storage and for effecting entry of the data address at said location into the address register, an interrupt mode latch set by a signal from said interrupt latch, and means controlled by said interrupt mode latch to disable said normally operable transferring means to block further entries into the interrupt register, said machine now operating in an interrupt mode wherein an independent sequence of operations will be performed under control of the data address in the address register.

9. A data processing machine as defined in claim 8 wherein program release means is provided to reset the set stacking latch and interrupt mode latch and for conditioning an interrupt register readout latch, said readout latch causing the data address in said interrupt register to transfer to the address register whereby the machine will be returned to the point in the main sequence of operation where the interruption occurred.

10. A stored program type data processing machine comprising, in combination, general storage means for storing programming data, means controlled by said general storage means for advancing said machine through a main program routine, a plurality of input and output devices for transferring information into and out of said general storage means, program interrupt means under control of said input and output devices for automatically interrupting said main program routine, means controlled by said interrupt means for advancing said machine through a program subroutine which is independent of said main program routine, and means effective at the end of said independent program subroutine for automatically returning the machine to the point in the main program routine where the interruption occurred.

11. A stored program type data processing machine comprising, in combination, general storage means for storing programming data relating to a main program routine and other programming data relating to program subroutines, means controlled by said general storage means for advancing said machine through a main program routine, a plurality of input and output devices for transferring information into and out of said general storage means, program interrupt means under control of said input and output devices for automatically interrupting said main program routine, control means responsive to said program interrupt means for placing said machine under control of said other programming data whereby said machine is advanced through a program subroutine which is independent of said main program routine, and programmed interrupt release means effective at the end of said independent program subroutine for automatically returning the machine to the point in the main program routine where the interruption occurred.

References Cited in the file of this patent

UNITED STATES PATENTS

| | | |
|---|---|---|
| 2,636,672 | Hamilton et al. | Apr. 28, 1953 |
| 2,789,759 | Tootill et al. | Apr. 23, 1957 |
| 2,797,862 | Andrews et al. | July 2, 1957 |
| 2,810,516 | Tootill et al. | Oct. 22, 1957 |